P. EVANS.
CHANGE SPEED GEAR FOR MOTORS.
APPLICATION FILED MAY 10, 1906. RENEWED NOV. 4, 1908.

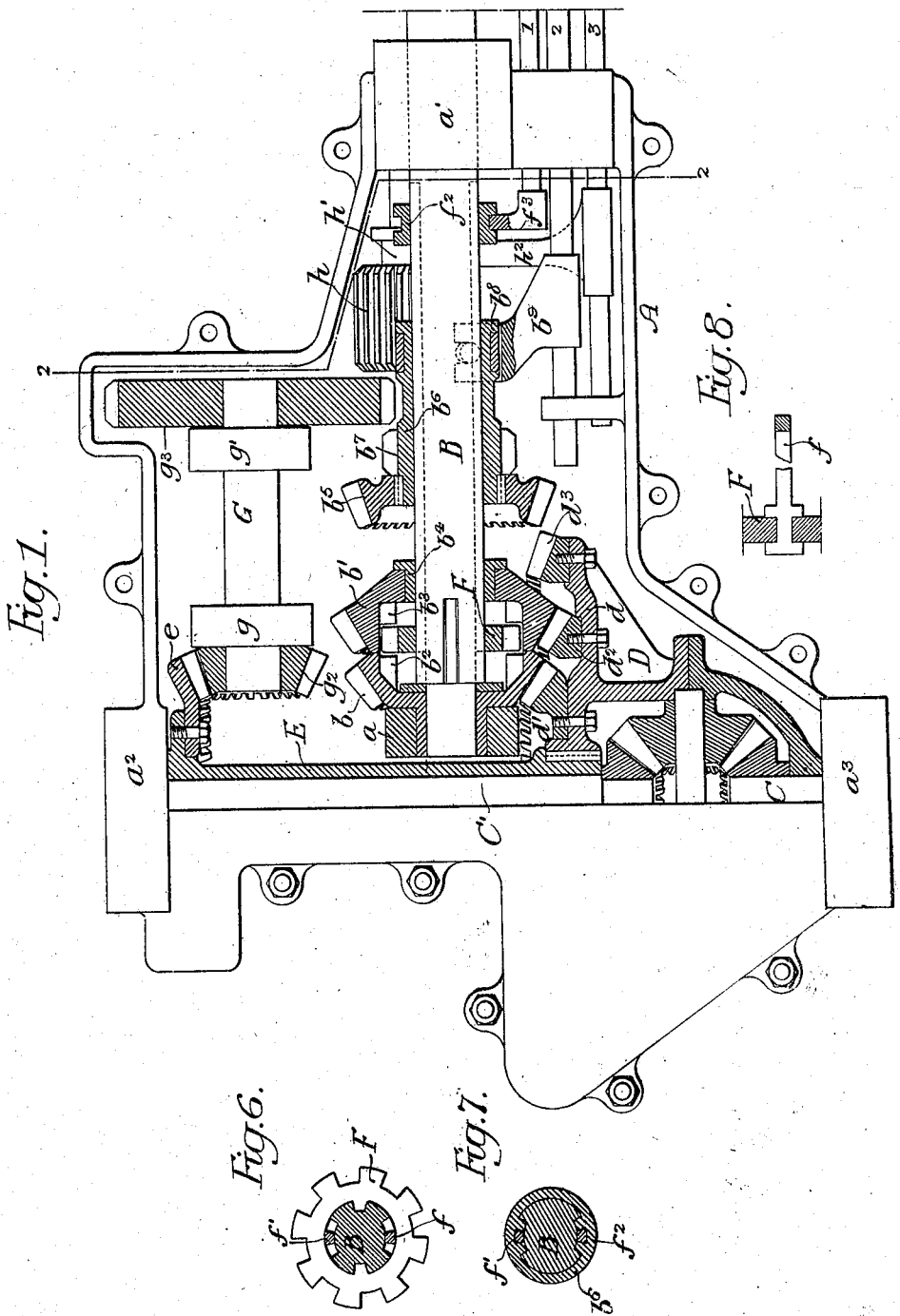

923,636.

Patented June 1, 1909.

3 SHEETS—SHEET 2.

Witnesses:—
Wills A. Burrowes
Titus H. Irons

Inventor:—
Powell Evans,
by his Attorneys,
Howson & Howson

P. EVANS.
CHANGE SPEED GEAR FOR MOTORS.
APPLICATION FILED MAY 10, 1906. RENEWED NOV. 4, 1908.

923,636.

Patented June 1, 1909.
3 SHEETS—SHEET 3.

Witnesses:—

Inventor
Powell Evans.
by his Attorneys,
Howson & Howson

UNITED STATES PATENT OFFICE.

POWELL EVANS, OF PHILADELPHIA, PENNSYLVANIA.

CHANGE-SPEED GEAR FOR MOTORS.

No. 923,636.   Specification of Letters Patent.   Patented June 1, 1909.

Application filed May 10, 1906, Serial No. 316,086. Renewed November 4, 1908. Serial No. 461,091.

*To all whom it may concern:*

Be it known that I, POWELL EVANS, a citizen of the United States, residing in Philadelphia, Pennsylvania, have invented certain Improvements in Change-Speed Gear for Motors, of which the following is a specification.

My invention relates to a novel form of gearing of a class commonly employed in automobiles to transmit power from the motor shaft to a driven shaft, by which said latter shaft may be operated in one direction at any one of a number of speeds, usually four, and in a reverse direction at a single speed, while said motor shaft is operated at an approximately constant speed in one direction.

One object of the invention is to provide a transmission gear of the above class and possessed of the general characteristics of the mechanism described and claimed in my application for patent, No. 310,148, filed April 5, 1906, but which shall be of a simpler construction and require fewer parts while being capable of accomplishing the same ends.

I further desire to provide a transmission gear having controlling mechanism, which while possessing but few parts shall include locking mechanism for maintaining any one of the control rods not only in its neutral position, but in the position corresponding to a definite combination of the change speed gearing, after said rod has been moved to such position.

These objects and other advantageous ends I secure as hereinafter set forth, reference being had to the accompanying drawings, in which:—

Figure 4:
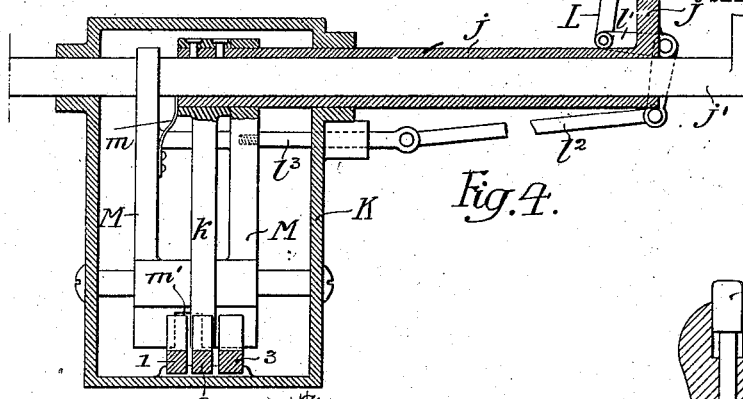
Figure 5:
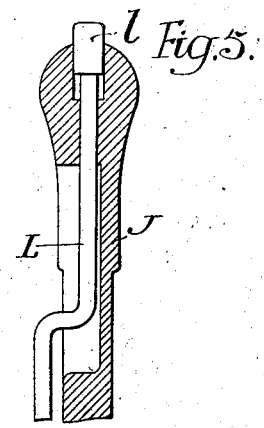
Figure 3:
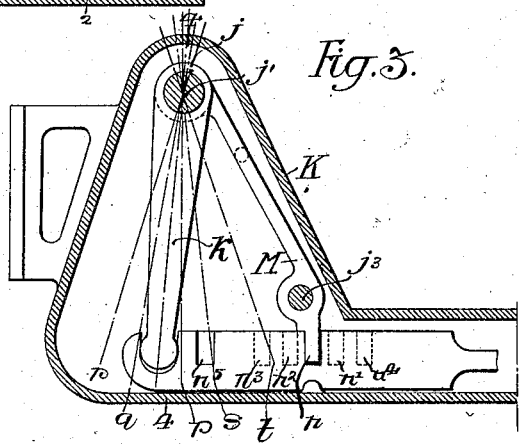
Figure 2:
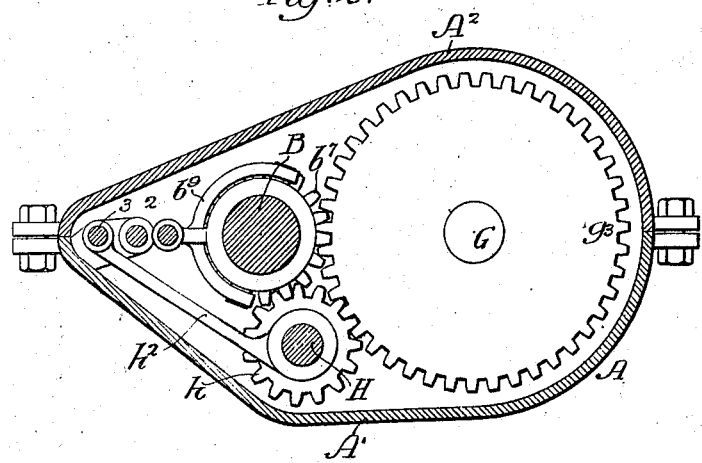
Figure 9:
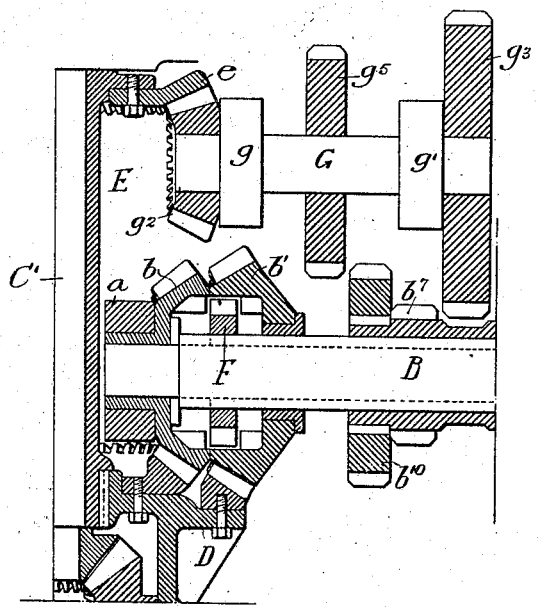
Figure 10:
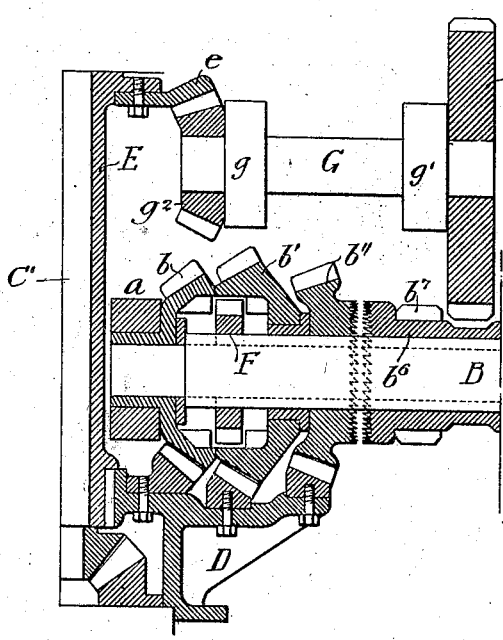

Figure 1, is a plan, partly in section, of the various gears with their inclosing casing and the control rods arranged according to my invention; Fig. 2, is a vertical section taken on the line 2—2, Fig. 1; Fig. 3, is a vertical section taken through the casing inclosing certain of the controlling mechanism; Fig. 4, is a vertical section taken on the line 4—4, Fig. 3; Fig. 5 is a vertical section taken through the operating lever, illustrating the lock controlling mechanism; Fig. 6, is an elevation illustrating the preferred form of key for connecting either of the bevel gears to the motor shaft; Fig. 7, is a vertical section taken through the motor shaft and one of the gear carrying sleeves thereon; Fig. 8, illustrates the means of connecting the sliding keys of the motor shaft with the key for connecting either of the bevel gears to said shaft, and Figs. 9 and 10, are horizontal sections illustrating special forms of gearing constructed according to my invention.

In the above drawings, A represents the gear casing, usually made in two sections A' and A², inclosing certain of the mechanism hereafter described and provided with bearings $a$ and $a'$ for a shaft B connected to the car motor. Other bearings $a^2$ and $a^3$ are also provided for a differential shaft made in two parts C and C', connected by differential gearing in the well known manner. This latter gearing is retained in and partially supported by a casing D, a part of which consists in the present instance of a plate $d$ keyed to a tubular shaft E which is revoluble on the part C' on the differential shaft.

Bolted or otherwise suitably attached to the plate $d$ are any desired number of beveled racks, in the present instance three, indicated by the letters $d'$, $d^2$ and $d^3$, and the first two of these permanently mesh with two bevel gears $b$ and $b'$ carried loosely upon the motor shaft B, but capable of being operatively connected thereto by means of a key F inclosed by said gears and slidable on said motor shaft.

The interior portion of the two gears $b$ and $b'$ are toothed as indicated at $b^2$ and $b^3$ so as to be capable of engagement by the teeth of the key F and this latter is slidable longitudinally upon the shaft B by means of two keys $f, f'$, extending in suitable key-ways and fixed at their opposite ends to a sliding collar $f^2$. This latter is engaged by a forked piece $f^3$ attached to the end of a longitudinally movable rod 1.

The gear $b'$ is carried upon a collar $b^4$, and the third rack $d^3$, carried by the plate $d$, is placed to be engaged by a beveled gear $b^5$, carried upon or integral with an elongated sleeve $b^6$. This sleeve, as shown in Fig. 7, while being slidably mounted on the shaft B, is keyed thereto and, in addition, is provided with a plane or spur gear $b^7$. There is also a collar $b^8$ on said sleeve engaged by a forked arm carried upon a longitudinally movable control rod 2 extending into and guided in the gear casing A.

A second shaft G is carried within the casing A in bearings $g$ and $g'$ and is provided with a beveled gear $g^2$ permanently in mesh with a beveled gear $e$ fixed to the tubular shaft E. There is also on the shaft G a relatively large spur gear $g^3$ of such a diameter as to be capable of meshing with the gear $b^7$ when this is moved into its plane.

A third shaft H, parallel to the motor shaft, is carried within the casing A so as to be movable longitudinally and has fixed to it a relatively long gear $h$ capable of meshing simultaneously with the gears $b^7$ and $g^3$, when these are in different planes. There is on said shaft a collar $h'$ engaged by the arm $h^2$ fixed to a third longitudinally movable control rod 3, whereby said gear may be shifted.

By this arrangement of parts if the key F be moved so as to couple the beveled gear $b$ to the shaft B then the shaft E is driven at the fourth speed through said gear and beveled rack $d'$. If, however, the key F be moved in the opposite direction from that above noted, the bevel gear $b'$ is coupled to the motor shaft so that the tubular shaft E and consequently the differential shaft are driven at the third speed through beveled rack $d^2$. With the key F in the neutral position shown in Fig. 1, the control rod 2 may be so moved as to bring beveled gear $b^5$ in engagement with beveled rack $d^3$, in which case the tubular shaft E is driven at the third speed, and it will be noted that in each of these three instances the drive is direct from the motor shaft.

To drive the shaft E at the fourth speed, I slide the sleeve $b^6$ by means of the control rod 2 so as to bring the gear $b^7$ into mesh with the gear $g^3$:—power being thus transmitted from the motor shaft to the gear $b^7$, gear $g^3$, beveled gears $g^2$ and $e$ and so to said shaft E.

If it be desired to reverse the direction of rotation of the driven shaft, the various gears are first placed in their neutral positions, as shown in Fig. 1, after which the shaft H is moved so as to bring the long gear $h$ into mesh with the two gears $b^7$ and $g^3$, thereby turning the latter of these gears in a direction the reverse of that previously noted and so reversing the direction of rotation of the shaft E.

For the purpose of actuating the control rods, I provide an operating lever J fixed to a tubular spindle $j$ operatively mounted upon a shaft or spindle $j'$, which may or may not form part of the car controlling mechanism. Suitably supported in any desired manner, usually at some convenient point on a cross bar of the chassis, I provide a casing K through which the bar or shaft $j'$ passes and into which the tubular shaft $j$ enters. Within said casing and fixed to said tubular shaft is a single downwardly extending actuating lever or arm $k$, having a rounded head adapted to fit in suitable slots in the ends of the control rods 1, 2, 3. Said tubular shaft $j$ is free to move longitudinally upon its supporting shaft $j'$ so as to bring the arm $k$ into engagement with any one of said three control bars, and such movement may be accomplished by proper manipulation of the operating lever J, which may be retained in any given position by means of gate mechanism similar in general construction to that described and claimed in my above mentioned application for patent.

As shown in Fig. 5, the operating lever J has in its head a push button $l$ connected to a rod L whose lower end is in turn pinned to one arm of a bell crank lever $l'$ mounted on the tubular shaft $j$. A link $l^2$ and a rod $l^3$ serve to connect the second arm of the lever $l'$ to a locking piece M, which is mounted so as to be slidable transversely of the casing K, being guided by the shafts $j$, $j'$, as well as by a cross bar $j^3$ extending across the lower part of the casing K. Said locking piece is therefore movable independently of the tubular shaft $j$ and of the arm $k$, though it is normally maintained in a definite position relatively to these parts by means of a spring $m$, preferably placed as shown. The said locking piece has a flat extension projecting below the bar $j^3$ in which is formed a recess $m'$, as shown in Fig. 4, and said extension operates in suitably formed recesses in the various control bars 1, 2, 3. Each of said bars has, in addition to the single recess normally occupied by the lower end of the locking piece M another recess or recesses placed as indicated in dotted lines in Fig. 3, for a purpose hereafter noted; there being thus in bar 1 recesses $n'$ and $n^2$ respectively on each side of the neutral recess $n$. Similarly, there are two recesses $n^3$ and $n^4$ in the rod 2 also on opposite sides of the neutral recess $n$ and a single recess $n^5$ in the bar 3 placed between the neutral recess $n$ and the actuating arm $k$.

With this arrangement of apparatus, when it is desired to shift bar 1 so as to couple the motor shaft B and the bevel gear $b$, the operating lever J is moved sidewise so as to slide the tubular shaft $j$ upon the shaft or bar $j'$ a sufficient distance to bring the head of the arm $k$ into the notch in the end of the control rod 1. Said lever is held in such a position in any desired manner, preferably by means of a notched gate, such as that above referred to and shown in my application for patent aforesaid, after which the button $l$ in the head of the lever J is pushed downwardly. This turns the bell crank lever $l'$ on its pivot and moves the locking piece M relatively to the arm k so that the recess m' in said piece is brought fairly into line with the control rod 1. The other two rods 2 and 3 are locked from moving, since the lower extension of the locking piece engages their neutral recesses n and if the operating lever J be turned on the shaft or bar j' as an axis in such a manner as to swing the arm k to the position indicated by the line p—p, the control rod 1 is moved into the gear case A, and the beveled gear $b^3$ will be coupled to the motor shaft B, as desired. If, while the operating lever J is in the position noted, pressure on the button l be removed the spring m will immediately force the locking piece M sideways into the slot or recess n' in the control rod 1, which is thus locked in its operative position. Similarly, in order to couple the beveled gear b' to the shaft B, the operating lever J is turned in a direction opposite to that above noted to couple said shaft and the gear b, thereby swinging the arm k to the position indicated by the line q—q and causing the key F to make the connection desired. In order to make the various other combinations of gearing above described, it is only necessary to move the operating lever parallel to itself until the arm k is brought into engagement with the desired one of the control rods 2 and 3 and then, after unlocking said rod by depression of the button l, turn the lever J forward or backward till the arm k occupies one of the positions indicated by the lines r—r, s—s or t—t. Such turning longitudinally moves the particular control rod engaged and effects the desired combination of gearing, after which the removal of the pressure upon the button l will lock the rod moved in the given position preventing its return to the neutral position until it is unlocked by proper depression of the button l.

If desired, I may employ in place of the third pair of beveled gears $d^3$ and $b^5$, an arrangement of gearing such as is shown in Fig. 9, in which case the second of these gears is replaced by a spur gear $b^{10}$ designed to mesh with a second spur gear $g^5$ fixed to the shaft G. Again, as shown in Fig. 10, I may use a beveled gear $b^{11}$ permanently in mesh with the beveled rack $d^3$, providing upon one of its faces a series of clutch teeth designed to coöperate with a second set of clutch teeth formed upon the adjacent end of the sleeve $b^6$. In either case, however, the operation of the device is substantially the same, since the movement of the sleeve $b^6$ toward the shaft E from its neutral position results in the driving of said shaft at the third speed, though in the latter case such drive is direct, while in the former case the drive is through the intermediate shaft G.

I claim as my invention:

1. A transmission gear consisting of two parallel shafts, a third shaft at right angles thereto and a plurality of beveled gears thereon, beveled gears loose on one of the shafts and respectively meshing with said first gears, means for connecting at will any one of said loose gears with its shaft, beveled gears respectively connecting the second and third shafts, a spur gear on the second shaft, a second spur gear slidable on but splined to the first shaft and capable of meshing with said first spur gear, one of the beveled gears being movable with said second spur gear, and means for moving said second spur gear on its shaft, substantially as described.

2. A transmission gear consisting of two parallel shafts, a third shaft at right angles thereto and a plurality of beveled gears thereon, beveled gears loose on one of the shafts and respectively meshing with said first gears, means for connecting at will any one of said loose gears with its shaft, beveled gears respectively connecting the second and third shafts, a spur gear on the second shaft, a second spur gear slidable on but splined to the first shaft and capable of meshing with said first spur gear, with a fourth shaft having a gear capable of being moved to operatively connect said spur gears, substantially as described.

3. A transmission gear consisting of two parallel shafts, a third shaft at right angles thereto and a plurality of beveled gears thereon, beveled gears loose on one of the shafts and respectively meshing with said first gears, means for connecting at will any one of said loose gears with its shaft, beveled gears respectively connecting the second and third shafts, a spur gear on the second shaft, a second spur gear slidable on but splined to the first shaft and capable of meshing with said first spur gear, a gear also carried on the first shaft, and a gear or gears, in addition to said other gears, for transmitting power from said last gear to the third shaft, with means for actuating said gears at will, substantially as described.

4. A transmission gear consisting of two parallel shafts, a third shaft at right angles thereto, a plurality of beveled gears on the third shaft, a plurality of beveled gears on one of the other shafts meshing therewith, beveled gears connecting the second and third shafts, a sleeve rotatably fixed to the first shaft but slidable thereon, two gears on said sleeve, a gear on the second shaft capable of being engaged by one of said gears on the sleeve, a gear connected to the third shaft capable of being engaged by the other one of the gears on the sleeve, and means for sliding said sleeve on its shaft, substantially as described.

5. A transmission gear consisting of two parallel shafts, a third shaft at right angles thereto, a plurality of beveled gears on the third shaft, a plurality of beveled gears on one of the other shafts meshing therewith, beveled gears connecting the second and third shafts, a sleeve rotatably fixed to the first shaft but slidable thereon, two gears on said sleeve, a gear on the second shaft capable of being engaged by one of said gears on the sleeve, a gear connected to the third shaft capable of being engaged by the other one of the gears on the sleeve, means for sliding said sleeve on its shaft, and a long faced gear capable of being moved to simultaneously engage a gear on the sleeve and the gear on the second shaft while these are lying in different planes, substantially as described.

6. The combination in a transmission gear of two parallel shafts, a shaft at right angles thereto, a plurality of beveled gears on the third shaft, other beveled gears loose on one of the shafts and respectively meshing with certain of said first mentioned gears, means for rotatably connecting at will said loose gears to their shaft, a sleeve rotatable with but slidable on said first shaft, a beveled gear on the sleeve capable of being moved into mesh with one of the beveled gears on the third shaft, a spur gear also on the sleeve, a gear on the second shaft capable of being engaged by said spur gear, and means for connecting said second and third shafts, substantially as described.

7. The combination in a transmission gear of two parallel shafts, a shaft at right angles thereto, a plurality of beveled gears on the third shaft, other beveled gears loose on one of the shafts and respectively meshing with certain of said first mentioned gears, a sleeve rotatable with but slidable on said first shaft, a beveled gear on the sleeve capable of being moved into mesh with one of the beveled gears on the third shaft, a spur gear also on the sleeve, a gear on the second shaft capable of being engaged by said spur gear, means for connecting said second and third shafts, a longitudinally movable gear of a length sufficient to simultaneously engage a spur gear on the first shaft and the gear on the second shaft while these are lying in different planes, means for connecting any one of the loose gears to the first shaft at will, and means for moving the sleeve and the long gear, substantially as described.

8. The combination of two parallel shafts, a pair of beveled gears loose on one shaft, a key movable to connect either one of said gears to said shaft at will, a third shaft three beveled gears thereon, of which two are permanently in mesh with said gears on the first shaft, a sleeve movable on the first shaft, a beveled gear thereon capable of being moved into engagement with the third gear of the third shaft, a spur gear on the sleeve, a second spur gear on the second shaft capable of being engaged by the spur gear on the sleeve, beveled gears for connecting the second shaft with the third shaft, and two rods for respectively moving said sleeve and said key, substantially as described.

9. The combination of two parallel shafts, a pair of beveled gears loose on one shaft, a key movable to connect either one of said gears to said shaft at will, a third shaft three beveled gears thereon, of which two are permanently in mesh with said gears on the first shaft, a sleeve movable on the first shaft, a beveled gear thereon capable of being moved into engagement with the third gear of the third shaft, a spur gear on the sleeve, a second spur gear on the second shaft capable of being engaged by the spur gear on the sleeve, beveled gears for connecting the second shaft with the third shaft, two rods for respectively moving said sleeve and said key, with a long faced gear capable of simultaneously engaging the two spur gears of the first and second shafts, and a rod for moving said long gear, substantially as described.

10. A transmission gear consisting of a driving and a driven shaft, gearing capable of operatively connecting said shafts, means for controlling said gearing including a plurality of rods, a shaft capable of longitudinal and rotary motion, a single arm thereon capable of engaging any one of said rods, and locking means for the rods operative at will independently of the arm, substantially as described.

11. A transmission gear consisting of a driving and a driven shaft, gearing capable of operatively connecting said shafts, means for actuating said gearing including a plurality of control rods, a shaft capable of longitudinal and rotary motion, a single arm thereon capable of engaging any one of said rods, with means for locking one of the rods in an operative position and the remainder of the rods in their neutral positions, substantially as described.

12. A transmission gear consisting of a driving and a driven shaft, gearing capable of operatively connecting said shafts, means for actuating said gearing including a plurality of control rods, a shaft capable of longitudinal and rotary motion, a single arm thereon capable of engaging any one of said rods, a locking piece yieldingly connected to said arm and capable of maintaining one of the rods in an operative position and the remainder of the rods in their neutral positions, and means for actuating said locking piece independently of the arm, substantially as described.

13. A transmission gear consisting of a driving and a driven shaft, gearing capable of operatively connecting said shafts, means for actuating said gearing including a plurality of control rods, a shaft capable of longitudinal and rotary motion, a single arm thereon capable of engaging any one of said rods, a locking piece movable relatively to said arm and provided with a recess, there being notches in said rods for the reception of said locking piece, both when the rods are in their neutral positions and when they are in their operative positions, and means for moving said locking piece independently of the arm, substantially as described.

And the above are my specifications.

POWELL EVANS.

Witnesses of signature:
ERNEST SANTI,
WILL E. THOMPSON.